United States Patent [19]

Grimm et al.

[11] 4,151,092

[45] Apr. 24, 1979

[54] PORTABLE WATER FILTER

[75] Inventors: Thomas Grimm, Ft. Collins; Douglas Ewald, Greeley, both of Colo.

[73] Assignee: Teledyne Industries, Inc., Fort Collins, Colo.

[21] Appl. No.: 814,485

[22] Filed: Jul. 11, 1977

[51] Int. Cl.² .................. B01D 27/02; B01D 33/00
[52] U.S. Cl. .................. 210/256; 210/257 R; 210/258; 210/261; 210/282; 210/359; 210/416 DW
[58] Field of Search ............. 210/62, 206, 216, 256, 210/257 R, 258, 261, 282, 416 DW, 359, DIG. 23; 220/23; 417/234, 235, 313

[56] References Cited

U.S. PATENT DOCUMENTS

| | | | |
|---|---|---|---|
| 400,301 | 3/1889 | Chichester | 210/258 X |
| 416,076 | 11/1889 | Rieck | 210/258 X |
| 1,386,340 | 8/1921 | Wuster | 210/359 |
| 1,435,790 | 11/1922 | Bachman | 210/206 X |
| 1,699,873 | 1/1929 | Brodsky | 210/359 X |
| 2,335,458 | 11/1943 | Senyal | 210/257 R |
| 2,456,524 | 12/1948 | Meincke, Jr. | 210/257 R |
| 2,808,154 | 10/1957 | Scott | 210/62 X |
| 2,820,701 | 1/1958 | Leslie | 210/206 X |
| 3,199,707 | 8/1965 | Folkman | 220/23 X |
| 3,367,484 | 2/1968 | Nelson | 220/23 X |
| 3,701,728 | 10/1972 | Appleman | 210/62 X |
| 3,832,141 | 8/1974 | Haldopoulos | 210/359 X |
| 3,865,731 | 2/1975 | Seitz | 210/DIG. 23 |
| 3,950,253 | 4/1976 | Stern | 210/282 |
| 3,969,250 | 7/1976 | Farr | 210/DIG. 23 |
| 4,054,526 | 10/1977 | Muller | 210/282 X |

FOREIGN PATENT DOCUMENTS

| | | | |
|---|---|---|---|
| 910821 | 9/1972 | Canada | 210/282 |
| 612264 | 4/1935 | Fed. Rep. of Germany | 210/359 |
| 2313855 | 12/1975 | France | 417/234 |
| 25730 of | 1914 | United Kingdom | 210/282 |

Primary Examiner—Robert H. Spitzer
Attorney, Agent, or Firm—Hugh H. Drake

[57] ABSTRACT

A portable water filter has a first cylindrical container for holding a quantity of liquid to be treated. Included in the filter is a water filter cartridge which is mounted with respect to the first container for treating liquid which is pumped through the filtering material within the cartridge. A second container is coupled to the cartridge and arranged to receive the liquid pumped through the cartridge from the first container. The arrangement is such as to permit manual pumping of the liquid from that first container through the cartridge into the second container. Desirably, the pumping action is achieved by telescopingly inserting the second container within the first container. In addition to its direct treatment of the liquid, the filtering material serves to remove undesired color, taste and odor induced by a disinfectant or bactericidal agent used with the system.

27 Claims, 10 Drawing Figures

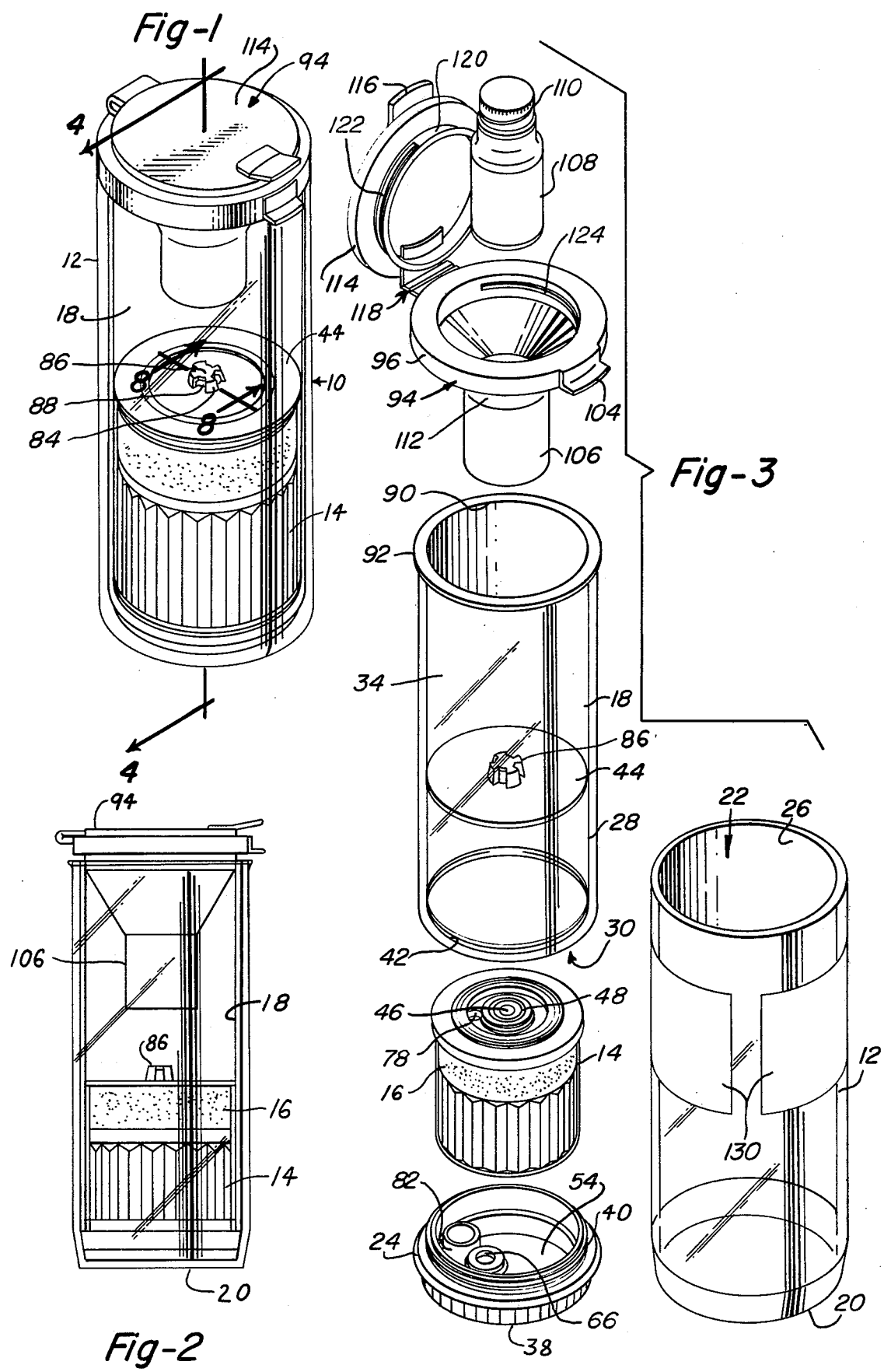

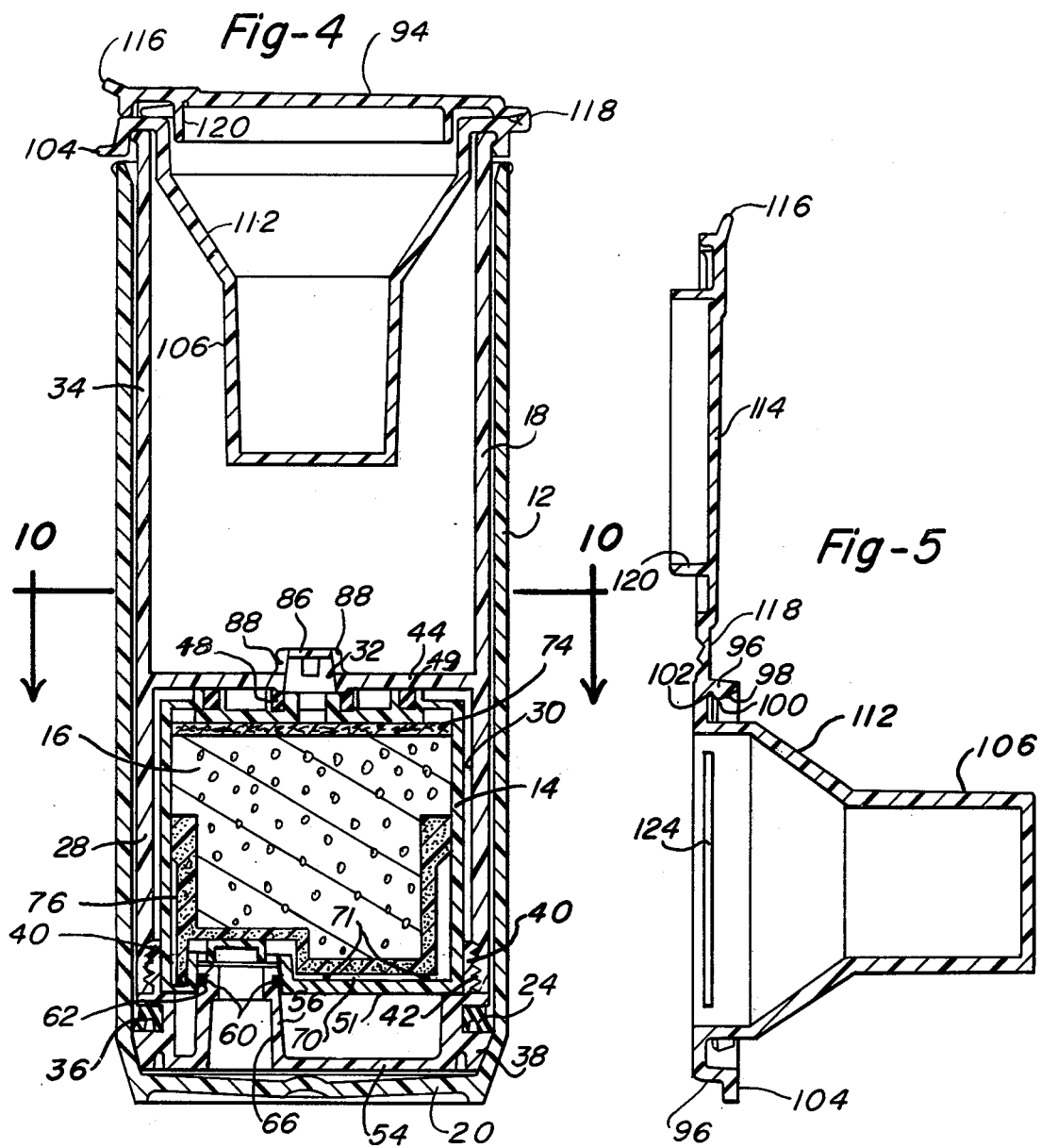

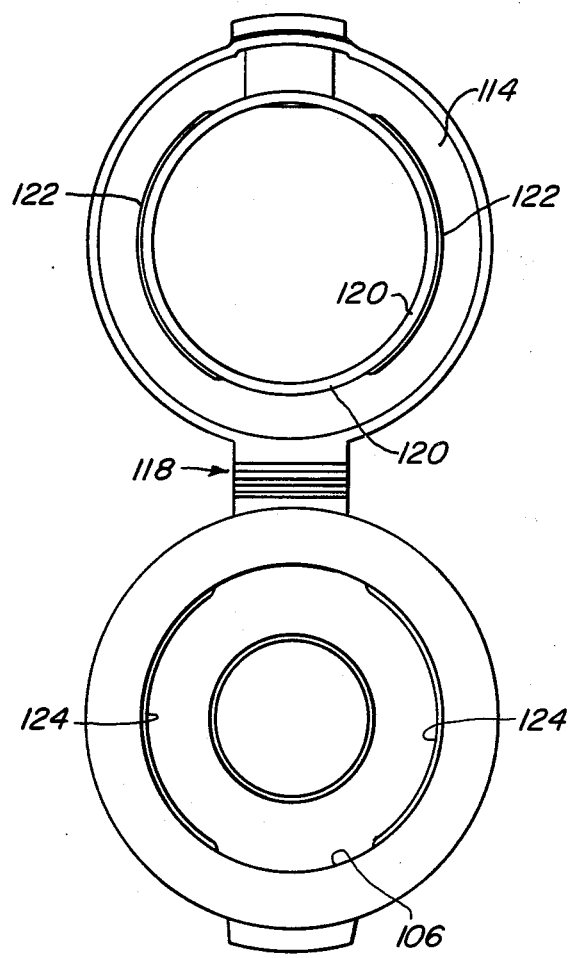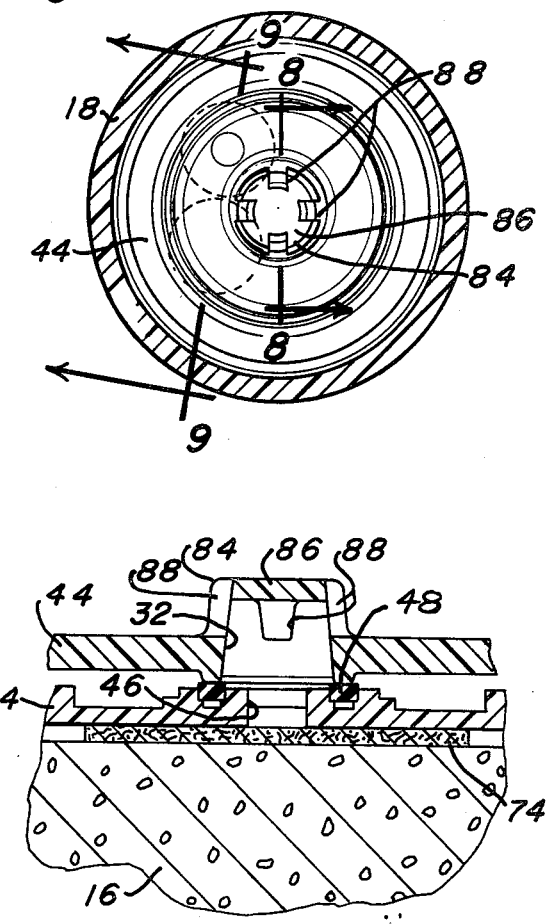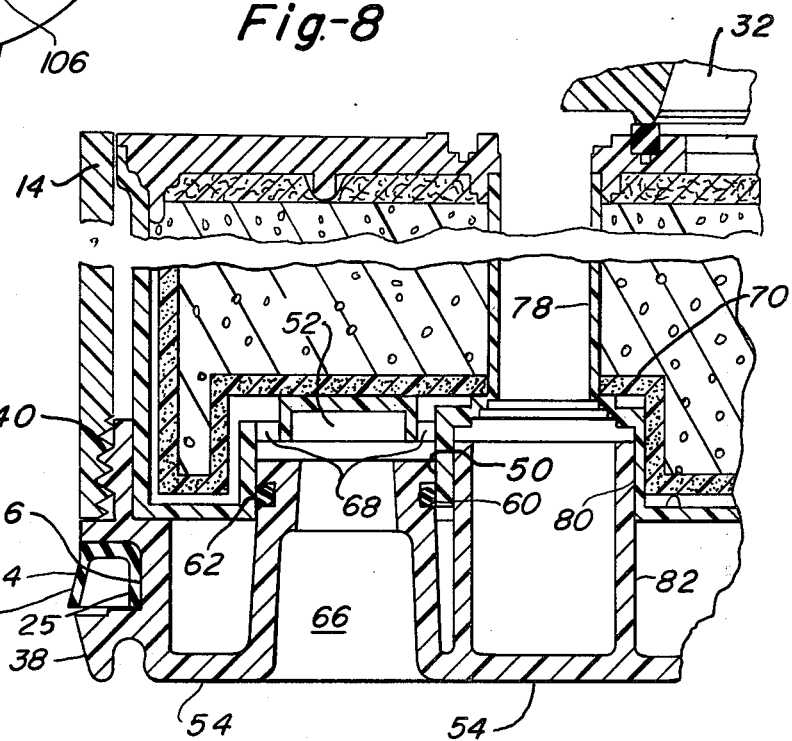

PORTABLE WATER FILTER

The present invention pertains to portable water filters. More particularly, it relates to a filter arranged to be easily carried and manually operated by a user desiring to treat water obtained from sources which may be contaminated.

By common experience, everyone knows that the absence of the intake of water or an equivalent liquid for a period of time measured only in a comparatively few hours leaves a person uncomfortable with thirst. The continuing absence of water soon begins to affect the person's capabilities for physical performance. Indeed, the absence of water intake for a few days, the number depending upon external conditions such as temperature, humidity and physical exertion, will be fatal.

Thus, one of the first concerns for a person planning or protecting against the possibility of being away from a domestic water supply for an extended period of time is to seek to insure that he will have adequate water available. A few examples of such persons would be hikers, campers, hunters, military personnel and those traveling by vehicle through remote regions. Typically, canteens and other water containers often are relied upon to provide the water necessary during the expected period of need. However, the size and weight of such water-filled containers usually places a definite upper limit on the quantity of water which may be so carried or otherwise transported.

Therefore, it frequently is necessary to replenish the portable water supply. In some cases, such replenishment poses no problem, because of the availability of secluded springs, rapidly rushing streams in pristine areas or wells available on scattered farms and ranches. Other areas often frequented by the type of person concerned afford no such relief. Any lakes or ponds may be polluted, small streams may offer only a slow trickle that may meander through swamps and bogs, and livestock grazing in such areas may have littered all such sources of water. An attempt to drink water of that sort may result in severe gastro-intestinal illness should the water be contaminated as it often is in those situations.

An analogous problem is presented to persons traveling through foreign regions. Even though municipal or other water systems may be available, the water sometimes is not suitable for intake by at least those persons who have not built up a necessary tolerance.

The problem described has long been recognized. For many years, military personnel have been supplied with, and other outdoor users have secured, iodine-containing tablets which are dissolved in any suspected water before its human intake. Properly carried out, that form of treatment with a disinfectant may be very advantageous in preventing harm to the user through the onset of illness. However, the water still may remain so discolored, filled with small particles or foul of smell as to be distasteful or even impalatable. Moreover, the disinfectant itself tends to discolor the water and add a taste of its own which may be undesirable to the user.

In an effort to overcome such disadvantages of the mere disinfectant approach, water filters have been suggested for use under field conditions. For example, one prior filter was in the form of what amounted to a drinking straw in which water filtering material was disposed, so that the user would suck the water through the filtering material. Of course, that approach basically limits the user to intake right at the source and of the acquisition only of that quantity which he may pull through the straw. It does not facilitate the replenishment of reserve supply.

It is, accordingly, a general object of the present invention to provide a new and improved portable water filter, one which overcomes one or more of the disadvantages in prior approaches such as those discussed above.

Another object of the present invention is to provide a new and improved portable water filter which permits both disinfecting the water and also removing discolor, bad taste and odor.

A further object of the present invention is to provide a new and improved portable water filter which is manually operated but yet enables the procurement of a significant reserve supply of treated water.

Still another object of the present invention is to provide a new and improved portable water filter which is compact for the purpose of permitting easy carrying and storage.

A still further object of the present invention is to provide a new and improved portable water filter which employs a replaceable filter cartridge of a kind readily available in the marketplace because of usage with a variety of other kinds of water filters.

Yet another object of the present invention is to provide a filter system which enables use of a disinfectant while overcoming disadvantages usually associated therewith.

A portable water filter in accordance with the invention has a first container for holding a quantity of liquid to be treated. Mounted with respect to that container is a filter cartridge. A second container coupled to the cartridge is arranged to receive liquid pumped through the cartridge from the first container. Further included are means for manually pumping the liquid from the first container through the cartridge to the second container.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a portable water filter;

FIG. 2 is a side elevational view thereof;

FIG. 3 is an exploded perspective view thereof;

FIG. 4 is a cross-sectional view taken along the line 4—4 in FIG. 1;

FIG. 5 is a cross-sectional view of a component shown in FIG. 4 but with elements thereof in a different position;

FIG. 6 is an enlarged fragmentary view of a portion of FIG. 5;

FIG. 7 is a top plan view of the component as shown in FIG. 5;

FIG. 8 is a fragmentary cross-sectional view taken along the line 8—8 in FIG. 10;

FIG. 9 is an enlarged fragmentary cross-sectional view taken along the line 9—9 in FIG. 10; and FIG. 10 is a cross-sectional view taken along the line 10—10 in FIG. 4.

In accordance with a preferred embodiment, a portable water filter 10 has a first cylindrical container 12 that serves to hold a quantity of liquid to be treated. A cartridge 14 is mounted with respect to container 12 and has the purpose of treating liquid pumped to flow from container 12 through a filtering material 16 contained within the cartridge. A second container 18 is coupled to cartridge 14 and arranged to receive the material pumped through the cartridge from container 12. The different components are so interrelated as to permit the achievement of manual pumping of the liquid from container 12 through cartridge 14 to container 18.

As such, a variety of manually-actuated pumping mechanisms are known which may be adapted to force the liquid through the cartridge from the one container to the other. These include, for example, pumps which feature any one of a piston, diaphragm or collapsible bellows. As herein preferably embodied, second container 18 and cartridge 14 are arranged to serve as a piston or plunger telescoping cooperative with container 12 so as to enable the manual pumping of the liquid through cartridge 14. To that end, container 12 is closed at one end 20 and open at its other end 22. The sidewall of container 18 is telescopingly receivable through end 22 of container 12. A cylindrical peripheral seal 24 is disposed between the inner wall 26 of container 12 and the assembly of cartridge 14 and container 18. Insertion of container 18 within container 12 creates pressure on liquid contained in container 12 so as to urge or pump the flow of the liquid through cartridge 14 and into container 18. Cartridge 14 thus becomes a significant part of the piston head.

In more detail, the lower end portion 28 of container 18 includes a cavity 30 within which cartridge 14 is seated. Cavity 30 includes an opening 32 which communicates between the cavity and an upper end portion 34 of container 18. Seal 24 is coupled to lower end portion 28 by means of its seating within a recess 36 circumferentially extending around the external wall formed in a plunger cap 38. Cap 38 is externally threaded as at 40 around its upper end so as to mate with internal threads 42 formed within the lower marginal end portion of container 18. Opening 32 is defined in a transverse wall 44 intermediate the length of container 18 and which serves to define the boundary between lower portion 28 and upper portion 34. Cartridge 14 includes an outlet opening 46 around which is seated a sealing element 48 that is matable between flow opening 32 and outlet opening 46. An outer seal 49 also may be included. Plunger cap 38 thus serves to couple cylindrical seal 24 to container 18, and its threaded relationship with container 18 also serves to sealingly mate element 48 between openings 32 and 46.

As shown in FIG. 4 and even in more detail in FIG. 9, seal 24 includes a downwardly opening cup 25 having a downwardly and outwardly depending resilient circumferential skirt or flap 27 the free end of which is forced against the inner wall of container 12 by the water in the lower portion of container 12 upon the telescoping together of containers 18 and 12. Thus, flap 27 is sealingly forced into closing relationship between the inner wall of container 18 and the outer wall of container 12 upon telescoping of those two containers to urge cartridge 14 against the quantity of water existing within the lower end of container 12.

Cartridge 14 includes a well 50 in its bottom wall 51 which leads to an inlet opening 52 that passes liquid to filtering material 16 within cartridge 14. Projecting upwardly from a transverse wall 54 of cap 38 is a hollow boss 56 which is receivable within well 50 and sealed within the latter by an O-ring 60 captivated in a groove 62. The interior of boss 56 defines an aperture 66 which is in communication with liquid in container 12 and thus is sealingly mated with inlet opening 52 in cartridge 14.

Within cartridge 14, water entering through well 50 is deflected laterally through circumferentially spaced apertures 68 in the bottom of well 50 and which serve the function of opening 52. Above bottom wall 51 is a space 70 defined by upstanding ribs 71. Filtering material 16 preferably is a granulated activated carbon. An outlet filter 74, preferably of felt, is sandwiched above the granulated filter material and adjacent to the top wall of cartridge 14. Seated on ribs 71 above opening 52, and effectively upstream from filtering material 16, is a filter element 76 of porous polyethylene. Element 76 serves as a pre-filter for coarse materials and also serves along with space 70 to cause distribution of the water laterally so as to obtain more uniform distribution through filter material 16. Preferably, at least the portion of the sidewall of cartridge 14 adjacent to element 76 is transparent so as to enable the user to observe the appearance of filter element 76. When new, the filter element is of a bright white color. With continued usage of cartridge 14, element 76 gradually becomes much darker in color. A complete discoloration, usually to a dark brown, serves as an indicator that it is time to replace cartridge 14.

Except for the inclusion of filter element 76, cartridge 14 is essentially the same structurally and functionally, at least insofar as usage with the portable water filter herein described is concerned, with the similar filter cartridges described in application Ser. No. 617,449, filed Sept. 29, 1975, and now abandoned, and in a continuation of that application Ser. No. 784,420, filed Apr. 4, 1977, as well as in co-pending application Ser. No. 691,830 filed June 1, 1976, all such prior applications being assigned to the same assignee as the present application. Apparatus as specifically disclosed in those prior applications may employ the specific filter cartridge described and depicted in this application. Conversely, the filter cartridge as specifically described and depicted in those prior applications may be utilized in the portable water filter apparatus of this present application. For further exemplification of details of the construction and manufacture of cartridge 14, those prior applications are, therefore, incorporated herein by reference.

Nevertheless, it will be seen that cartridge 14 constitutes a substantially closed housing which substantially confines the water filtering material therewithin. As shown in the drawings, it is dimensioned to be telescopingly received within the lower end of container 18. Its outlet opening 46 and inlet opening 52 permit a pressure-induced flow of water through the cartridge and the material confined therein. As revealed particularly by the details of construction shown in FIGS. 4 and 9, the cartridge permits such pressure-induced flow of water in either direction through the cartridge and the material that is confined within the housing of the cartridge.

For the purpose of retaining compatability and interchangeability as between cartridge 14 as intended for use in the portable water filter herein being described and other different water filter apparatus such as that disclosed in the aforesaid earlier applications, cartridge 14 includes an internal circuit 78 which runs lengthwise of cartridge 14 between its opposing end walls. Conduit 78 extends through filtering material 16 so as, when used with different water filters, to allow a by-pass of water through the conduit. As specifically shown, conduit 78 terminates in a well 80 formed into end wall 51 which also contains well 50. Accommodating conduit 78 and well 80 is a plug 82 upstanding from wall 54 of plunger cap 38 and which is engageable within well 80 associated with conduit 78. In this case, the engagement of plug 82 within well 80 assures concentric positioning of cartridge 14 so that proper alignment is achieved between openings 32 and 46 in association with sealing element 48.

Spaced above the upper side of opening 32 by legs 84 upstanding from transverse wall 44 is a plate 86. Legs 84 are circumferentially spaced around opening 32 so as to define a like plurality of laterally directed apertures 88 through which water entering opening 32 is directed outwardly into upper portion 34 of container 18. Thus, plate 86 and openings 88 serve together as a diffuser of the water incoming through the flow passage defined by opening 32. This prevents the possibility of the shooting of a jet or stream of water upwardly out of the top of container 18 when the latter is not covered.

Projecting laterally outward from the upper rim 90 of container 18 is a lip 92. In use, resilient seal 24 is formed to fit sufficiently tight within container 12 as to afford significant resistance to the withdrawal of container 18 from within container 12. Lip 92 assists the user in grasping container 18 for such withdrawal. As will be observed particularly in FIGS. 2 and 4, containers 12 and 18 are of respective lengths such that the upper end of container 18 projects above the upper end of container 12 when those two containers are telescoped fully together.

Container 18 further includes a cap 94 securable upon the otherwise open end of container 18 as defined by rim 90 and lip 92. In more detail, cap 94 includes a peripheral and downwardly depending skirt 96 the inner wall 98 of which bulges inwardly intermediate its height as at 100 so as to define a recess 102. With the mating materials being formed of a slightly deformable plastic, this approach enables cap 96 to be secured upon container 18 by a snapping of lip 92 into position within recess 102. A tab 104 projects outwardly from one side of the external wall of skirt 96, so as to assist the user in detaching cap 94 from container 18.

Spaced within skirt 96 and projecting downwardly from cap 94, and thus into the container 18 when cap 94 is in place, is a well 106 sized to receive a small bottle 108 containing disinfectant or germicidal tablets for storage. Well 106 preferably has a lateral diameter only slightly greater than that of bottle 108, and well 106 flares outwardly at its upper end portion 112 so as to enable the user to grasp cap 110 on bottle 108 for the purpose of removing the bottle from the well. A suitable tablet is one in which the active ingredient is tetraglycine hydroperiodide.

Hinged to swing into closing relationship over cap 94 is another cap 114 including another pull tab 116. As indicated at 118, cap 114 is in this case integrally hinged by a flexible strap to cap 94. Projecting downwardly from the cap 114, snugly within the inner and upper margin of well 106 above funnel 112, is a skirt 120 from the outer wall of which laterally project a diametrically-opposed pair of ribs 122. Ribs 122 snap over a correspondingly-placed pair of ribs 124 that project inwardly from the inner wall of the rim portion of well 106. It will thus be observed that caps 94 and 114 together constitute means for sealingly closing the upper end of container 18 as well as for enclosing the disinfectant medium or tablets contained within bottle 108.

Preferably disposed near the upper end of container 12 and printed on its external wall are labels 130 which bear identification and instructional information. While an instruction booklet desirably is to be consulted for details and variations in use, the intended usage in the field is aided by the inclusion of instructions imprinted directly on the container. A typical set of instructions would first advise the user to fill container 12 with raw water up to a level a mark for which may be included on one of panels 130. The user is then instructed to add a fraction or all of one or more of the tablets contained within bottle 108. Of course, the tablet amount to be added depends upon the overall size selected for portable water filter 20. The user is then instructed to allow the tablet material to dissolve for a prescribed period of time. Next, container 18 is inserted into container 12 so as to provide a cover for the water within container 12, thereby permitting the water within container 12 to be agitated. After waiting an additionally prescribed period of time, container 18, acting as a plunger, is depressed slowly within container 12 so as to pump the water from container 12 through cartridge 14 and into upper portion 34 of container 18. Thereafter, the user may directly drink the treated water from the upper portion of container 18, or he may pour the treated water from that container into some other storage recepticle.

By way of example only, upper portion 34 has a diameter of 2.5 inches and a depth of about three and three-quarters inches. The other parts have dimensions correspondingly proportioned as shown in the drawings. To obtain that amount of treated water, only one half of a commercially available germicidal tablet of the kind described usually is required, although cold or discolored water desirably may require a whole tablet and a longer waiting period after agitation. A small bottle as shown may have a capacity of fifty such tablets. Thus, many treatment cycles may be obtained under normal conditions from just one bottle of tablets no larger than conveniently may be carried in a shirt pocket.

As indicated at the outset, the end result is the attainment of treated water from which discolor, bad taste and undesirable odor has been removed. At the same time, the water has been treated germicidally. Significantly with respect to the latter, the filtering achieved by cartridge 14 removes coloring, taste and odor which otherwise would be present by reason of having used the disinfectant tablets. Operation is sufficiently simple as to permit use of the portable water filter without any necessity for undue strength or endurance. While a child could operate it, children, and others, should be warned concerning the disinfectant tablets contained within bottle 108, because they are of a kind, at least often, which are not to be swallowed directly.

For storage when not in use, the portable water filter herein described is particularly attractive in that all of the different components are telescoped together. As a result, the storage dimensions are only slightly longer than container 12. In fact, the unit could be stored with already treated water reserved within the upper portion of container 18.

Desirably, all of the components may be manufactured of plastic material, except for the filtering material itself and the sealing elements such as O-rings 48 and 60. Moreover, it is desirable that both containers 12 and 18 be formed of transparent material, so that the user may observe at least the differences in discoloration as between the untreated water in container 12 and the treated water which eventually rises into the upper portion of container 18. Being formed of molded plastic parts, it will be noted that economy is obtainable by direct molding of all components through use of conventional factory apparatus. At the same time, the resultant product is rugged and durable.

While a particular embodiment of the present invention has been shown and described, and possible modifications in some features have been mentioned, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A portable water filter comprising:

a first upright cylinder closed at one end and open at the other end;

a second upright cylinder telescopingly receivable within said first cylinder through said other end;

means, including a transverse wall spaced upwardly from the lower end of said second cylinder, disposed in and forming a part of the lower end portion of said second cylinder for defining a cavity receptive of a cartridge capable of filtering water flow therethrough;

and a cartridge receivable in said cavity and confining a material for filtering water pumped to flow through said cavity and said material as said second cylinder is pressed within said first cylinder, insertion of said second cylinder into said first cylinder creating pressure on liquid contained in said first cylinder.

2. A portable water filter comprising:

a first container for holding a quantity of liquid to be treated;

a cartridge for filtering liquid and mounted with respect to said first container for treating liquid pumped to flow from said first container through filtering material within said cartridge, said cartridge including means defining an inlet opening admitting fluid to said filtering material;

a second container coupled to said cartridge and arranged to receive said liquid pumped through said cartridge from said first container;

means for removably coupling said cartridge to said second container and having means defining an aperture communicating with liquid in said first container and sealingly matable with said inlet opening;

said inlet opening including a well and said aperture means including a boss projectable within said well;

and means for manually pumping liquid from said first container through said cartridge to said second container.

3. A portable water filter comprising:

a first container for holding a quantity of liquid to be treated;

a cartridge for filtering liquid and mounted with respect to said first container for treating liquid pumped to flow from said first container through filtering material within said cartridge, said cartridge including a conduit extending through said filtering material;

a second container coupled to said cartridge and arranged to receive said liquid pumped through said cartridge from said first container;

means for removably coupling said cartridge to said second container and having means defining a plug engageable within one end portion of said conduit;

and means for manually pumping said liquid from said first container through said cartridge to said second container.

4. A portable water filter comprising:

a first container for holding a quantity of liquid to be treated;

a cartridge for filtering liquid and mounted with respect to said first container for treating liquid pumped to flow from said first container through filtering material within said cartridge;

a second container coupled to said cartridge and arranged to receive said liquid pumped through said cartridge from said first container, said second container including means defining a flow passage for liquid leaving said cartridge and further including means for diffusing water flowing through said passage;

and means for manually pumping said liquid from said first container through said cartridge to said second container.

5. A portable water filter as defined in claim 4 in which said second container includes a transverse wall intermediate its length and in which said flow passage is located.

6. A portable water filter comprising:

a first container for holding a quantity of liquid to be treated;

a cartridge for filtering liquid and mounted with respect to said first container for treating liquid pumped to flow from said first container through filtering material within said cartridge;

a second container coupled to said cartridge and arranged to receive said liquid pumped through said cartridge from said first container;

means for manually pumping said liquid from said first container through said cartridge to said second container;

and a cap securable upon an otherwise open end of said second container, said cap including means defining a well therewithin for accommodating water-tight storage of a water treatment material.

7. A portable water filter as defined in claim 6 which further includes another cap closable to cover said well.

8. A portable water filter comprising:

a first container for holding a quantity of liquid to be treated, said first container being closed at one end and open at the other end;

a cartridge confining a material for filtering liquid and mounted with respect to said first container for treating liquid pumped to flow from said first container through said material within said cartridge;

a second container, open at both its upper and lower ends, coupled to said cartridge and arranged to receive said liquid pumped through said material from said first container, said second container being telescopingly receivable through said other end of said first container;

a peripheral seal disposed between the inner wall of said first container and the assembly of said second container and said cartridge;

means for manually pumping said liquid from said first container through said material to said second container, insertion of said second container within said first container creating pressure on liquid contained in said first container to urge flow of said liquid through said material and then to said second container;

the lower end portion of said second container including means, having a transverse wall spaced upwardly from the lower end of said second container, defining a cavity within which said cartridge is seated;

and said transverse wall including means defining an opening communicating between said cavity and the upper end portion of said second container.

9. A portable water filter comprising:
a first container for holding a quantity of liquid to be treated, said first container being closed at one end and open at the other end;
a cartridge confining a material for filtering liquid and mounted with respect to said first container for treating liquid pumped to flow from said first container through said material within said cartridge;
a second container, open at both its upper and lower ends, coupled to said cartridge and arranged to receive said liquid pumped through said material from said first container, said second container being telescopingly receivable through said other end of said first container;
a peripheral seal disposed between the inner wall of said first container and the assembly of said second container and said cartridge, said seal being coupled to the lower end portion of said second container;
means for manually pumping said liquid from said first container through said material to said second container, insertion of said second container within said first container creating pressure on liquid contained in said first container to urge flow of said liquid through said material and then to said second container;
said second container including a transverse wall defining upper and lower portions of said second container and having means in said wall defining a flow opening;
said cartridge including means defining an outlet opening and a sealing element matable between said flow opening and said outlet opening;
and means for coupling said seal to said second container while also mating said sealing element between said openings.

10. A portable water disinfecting and filtering apparatus comprising:
a first upright tubular container, closed at its lower end and open at its upper end, for holding a quantity of water to be treated;
a second upright tubular container, open at both its upper and lower ends, dimensioned to be telescopingly received within said first container through said upper end thereof;
a cartridge having a substantially closed housing substantially confining water filtering material and dimensioned to be telescopingly received within said lower end of said second container, said cartridge including respective openings permitting a pressure-induced flow of water through the cartridge and said material confined therein;
means for mounting said cartridge with respect to said lower end of said second container;
and means for sealingly closing said upper end of said second container as well as for enclosing a medium for disinfecting water placed within said first container.

11. A portable water filter apparatus as defined in claim 10 in which said first and second containers are of respective lengths such that the upper end of said second container projects above the upper end of said first container when said containers are telescoped fully together.

12. Apparatus as defined in claim 11 in which a peripheral lip projects laterally outward from the upper end of said second container.

13. Apparatus as defined in claim 12 in which said closing means includes a peripheral skirt sealingly engageable over said lip.

14. Apparatus as defined in claim 13 in which said closing means further includes means defining a well downwardly projecting within the interior of said second container for receipt of said medium and a cap detachably secured over said well.

15. A portable water filter apparatus comprising:
a first upright tubular container closed at its lower end and open at its upper end, for holding a quantity of water to be treated;
a second upright tubular container, open at both its upper and lower ends, dimensioned to be telescopingly received within said first container through said upper end thereof;
a cartridge having a substantially closed housing substantially confining water filtering material and dimensioned to be telescopingly received within said lower end of said second container, said cartridge including respective openings permitting a pressure-induced flow of water through the cartridge and said material confined therein;
means for mounting said cartridge with respect to said lower end of said second container;
a peripheral seal disposed between the inner wall of said first container and the outer wall of said second container;
and means for sealingly closing said upper end of said second container.

16. Apparatus as defined in claim 15 in which said first and second containers are of respective lengths such that the upper end of said second container projects above the upper end of said first container when said containers are telescoped fully together.

17. Apparatus as defined in claim 16 in which a peripheral lip projects laterally outward from the upper end of said second container.

18. Apparatus as defined in claim 17 in which said closing means includes a peripheral skirt sealingly engageable over said lip.

19. A portable water filter apparatus comprising:
a first upright tubular container, closed at its lower end and open at its upper end, for holding a quantity of water to be treated;
a second upright tubular container, open at both its upper and lower ends, dimensioned to be telescopingly received within said first container through said upper end thereof;
a cartridge having a substantially closed housing substantially confining water filter material and dimensioned to be telescopingly received within said lower end of said second container, said cartridge including respective openings permitting a pressure-induced flow of water through the cartridge and said material confined therein;

means for mounting said cartridge with respect to said lower end of said second container;

a peripheral seal disposed between the inner wall of said first container and the outer wall of second container;

and said first and second containers being of respective lengths such that the upper end of said second container projects above the upper end of said first container when said containers are telescoped fully together.

20. Apparatus as defined in claim 19 in which a peripheral lip projects laterally outward from the upper end of said second container.

21. A portable water filter apparatus comprising:

a first upright tubular container, closed at its lower end and open at its upper end, for holding a quantity of water to be treated;

a second upright tubular container, open at both its upper and lower ends, dimensioned to be telescopingly received within said first container through said upper end thereof;

a cartridge having a substantially closed housing substantially confining water filtering material and dimensioned to be telescopingly received within said lower end of said second container, said cartridge including respective openings permitting a pressure-induced flow of water through the cartridge and said material confined therein;

means for mounting said cartridge with respect to said lower end of said second container;

said first and second containers being of respective lengths such that the upper end of said second container projects above the upper end of said first container when said containers are telescoped fully together.

22. Apparatus as defined in claim 21 in which a peripheral lip projects laterally outward from the upper end of said second container.

23. A portable water filter apparatus comprising:

a first upright tubular container, closed at its lower end and open at its upper end, for holding a quantity of water to be treated;

a second upright tubular container, open at both its upper and lower ends, dimensioned to be telescopingly received within said first container through said upper end thereof;

a cartridge having a substantially closed housing substantially confining water filtering material and dimensioned to be telescopingly received within said lower end of said second container, said cartridge including respective openings permitting a pressure-induced flow of water through the cartridge and said material confined therein;

means for mounting said cartridge with respect to said lower end of said second container;

and means for removably securing said cartridge within the lower portion of said second container.

24. Apparatus as defined in claim 23 in which said securing means also seats a peripheral seal disposed between the inner wall of said first container and the outer wall of said second container.

25. A portable water filter apparatus comprising:

a first upright tubular container, closed at its lower end and open at its upper end, for holding a quantity of water to be treated;

a second upright tubular container, open at both its upper and lower ends, dimensioned to be telescopingly received within said first container through said upper end thereof;

a cartridge having a substantially closed housing substantially confining water filtering material and dimensioned to be telescopingly received within said lower end of said second container, said cartridge including respective openings permitting a pressure-induced flow of water through the cartridge and said material confined therein;

means for mounting said cartridge with respect to said lower end of said second container;

a peripheral seal disposed between the inner wall of said first container and the outer wall of said second container;

and said peripheral seal including means sealingly forced into closing relationship between the inner wall of said first container and the outer wall of said second container upon telescoping of said second container within said first container to urge said cartridge against said quantity of water.

26. Apparatus as defined in claim 25 in which said peripheral seal includes a downwardly-opening cup having a downwardly and outwardly depending resilient circumferential flap the free end of which is forced against said inner wall by said water upon said telescoping.

27. A portable water filter apparatus comprising:

a first upright tubular container, closed at its lower end and open at its upper end, for holding a quantity of water to be treated;

a second upright tubular container, open at both its upper and lower ends, dimensioned to be telescopingly received within said first container through said upper end thereof;

a cartridge having a substantially closed housing substantially confining water filtering material and dimensioned to be telescopingly received within said lower end of said second container, said cartridge including respective openings permitting a pressure-induced flow of water through the cartridge and said material confined therein;

means for mounting said cartridge with respect to said lower end of said second container;

a peripheral seal disposed between the inner wall of said first container and the outer wall of said second container;

and said cartridge permitting pressure-induced flow of water in either direction through said cartridge and said material confined therein.

* * * * *